United States Patent
Kano

(10) Patent No.: US 6,896,722 B2
(45) Date of Patent: May 24, 2005

(54) ZINC DUST CONTAINING SLURRY AND WATERBORNE COATING MATERIAL

(75) Inventor: Tatsuya Kano, Nagoya (JP)

(73) Assignee: Aisin Kako Kabushiki Kaisha, Nishikamo-Gun (JP)

(*) Notice: Subject to any disclaimer, the term of this patent is extended or adjusted under 35 U.S.C. 154(b) by 235 days.

(21) Appl. No.: 10/286,978

(22) Filed: Nov. 4, 2002

(65) Prior Publication Data

US 2003/0126950 A1 Jul. 10, 2003

(30) Foreign Application Priority Data

| Nov. 5, 2001 | (JP) | ........................................ | 2001-339147 |
| Mar. 25, 2002 | (JP) | ........................................ | 2002-083715 |
| Oct. 18, 2002 | (JP) | ........................................ | 2002-304863 |

(51) Int. Cl.⁷ ................................................ C22B 1/14
(52) U.S. Cl. ................................ 106/14.21; 106/14.44; 106/286.6; 106/287.1; 75/746
(58) Field of Search ........................... 106/14.21, 14.44, 106/286.6, 287.1; 75/746

(56) References Cited

U.S. PATENT DOCUMENTS 3,615,781 A * 10/1971 Schneider et al. .......... 106/626
3,721,574 A * 3/1973 Schneider et al. .......... 106/623
5,888,280 A * 3/1999 Montes ..................... 106/14.21

FOREIGN PATENT DOCUMENTS

JP 62-127366 A * 6/1987
JP 6-9897 1/1994

* cited by examiner

*Primary Examiner*—Anthony J. Green
(74) *Attorney, Agent, or Firm*—Westerman, Hattori, Daniels & Adrian, LLP

(57) ABSTRACT

A zinc dust containing slurry is prepared by mixing 7.8 weight percent of a solution of a sodium silicate. 72.0 weight percent of the demineralized water, 0.2 weight percent of a surface active agent and 20 weight percent of zinc dust. A waterborne coating material is obtained by mixing and stirring 25 parts by weight of a lithium silicate into 100 parts by weight of the zinc dust containing slurry.

17 Claims, No Drawings

ZINC DUST CONTAINING SLURRY AND WATERBORNE COATING MATERIAL

BACKGROUND OF THE INVENTION

1. Field of the Invention

This invention relates to a zinc dust containing slurry and a water coating material, particularly to a basic technique for manufacturing a water zinc rich paint.

2. Description of the Related Art

Paints utilizing sacrificial anticorrosion function of zinc on iron are widely used as a zinc rich paint. However, most of them contains organic solvent and have a problem in that they have a bad influence on the environment. On the other hand, water zinc rich paints have a problem in that they generate hydrogen gas in mixing zinc and water and in that they are inferior in antirust capability. Zinc rich paints containing chromic acid as a binder are widely used, too. However, there is also a problem that, since they contain chrome, they have a bad influence on the environment.

As described above, practical zinc rich paints contain the organic solvent or the chrome and are problematic in that they have a bad influence on the environment. On the other hand, the water zinc rich paints are not suitable for practical use at present. As a manufacturing method of a water zinc rich paint, Japanese Laid Open Patent Application No. 6-9897 discloses a method for covering zinc containing metal flakes with colloidal silica coating. However, the colloidal silica has high degree of polymerization and globular structure. Consequently, the colloidal silica becomes bulky and is not capable of forming a dense coating on a surface of zinc. Moreover, the colloidal silica is deficient in preventing the water from contacting with OH— (OH minus) ions. Furthermore, there is disadvantage that use of the colloidal silica causes increase of costs.

BRIEF SUMMARY OF THE INVENTION

An object of the present invention is to provide a zinc dust containing slurry and a water coating material as a basic technique for realizing a waterborne zinc rich paint that is practical and inexpensive.

According to the invention, there is provided A zinc dust containing slurry prepared by: adding a demineralized water to a solution of an alkali silicate so as to hydrolyze the alkali silicate and decrease a degree of polymerization of the alkali silicate; and mixing and stirring a zinc dust into the solution of the alkali silicate.

In a zinc dust containing slurry according to the invention, a mole ratio of a silica of the alkali silicate may be lowered so as to further decrease the degree of polymerization of the alkali silicate.

In a zinc dust containing slurry according to the invention, one or more of a vanadate, a zirconium salt, a tungstate and a molybdate may be added to the solution of the alkali silicate.

In a zinc dust containing slurry according to the invention, a surface active agent may be added to the solution of the alkali silicate.

A zinc dust containing slurry according to the invention may be prepared by mixing 0.5 to 7.8 weight percent of a solution of a sodium silicate, 72.0 to 79.3 weight percent of the demineralized water, about 0.2 weight percent of the surface active agent and about 20 weight percent of the zinc dust.

A zinc dust containing slurry according to the invention may be prepared by mixing about 1.0 weight percent of a solution of a sodium silicate, about 74.5 weight percent of the demineralized water, about 0.2 weight percent of the surface active agent, about 23.8 weight percent of the zinc dust, about 0.5 weight percent of one or more of a vanadate, a zirconium salt, a tungstate and a molybdate.

A zinc dust containing slurry according to the invention may be prepared by mixing about 1.0 weight percent of a sodium metasilicate, about 48.5 weight percent of the demineralized water, about 0.1 weight percent of the surface active agent, about 49.4 weight percent of the zinc dust, about 1.0 weight percent of one or more of a vanadate, a zirconium salt, a tungstate and a molybdate.

A waterborne coating material may be prepared by using the zinc dust containing slurry according to the invention.

A waterborne coating material according to the invention may be obtained by mixing and stirring a lithium silicate into the zinc dust containing slurry.

A waterborne coating material may be obtained by mixing and stirring 20 to 30 weight percent of a lithium silicate into 100 weight percent of the zinc dust containing slurry according to the invention.

A waterborne coating material may be obtained by mixing and stirring about 26.2 weight percent of a lithium silicate and about 15.6 weight percent of a sodium silicate into 58.2 weight percent of the zinc dust containing slurry according to the invention.

A waterborne coating material may be made of the zinc dust containing slurry according to the invention and a waterborne binder, the waterborne coating material containing 30 to 95 weight percent of solids content of the zinc dust containing slurry in a dried paint film of the waterborne coating material.

Further objects and advantages of the invention will be apparent from the following description, reference being had to the accompanying drawings, wherein preferred embodiments of the invention are clearly shown.

DETAILED DESCRIPTION OF THE INVENTION

Several embodiments of the invention are described hereunder.

First Embodiment

A zinc dust containing slurry and a waterborne coating material according to a first embodiment of the invention is described hereafter. The first embodiment of the zinc containing slurry is obtained as follows. First, demineralized water is added to an alkali silicate (water glass) so as to hydrolyze the water glass and lower the degree of polymerization thereof. Then, a surface active agent and zinc dust are mixed into such hydrolyzed compound. Thus, the zinc dust containing slurry is prepared.

Specifically, a sodium silicate ($Na_2O:SiO=1:3$) was added to the ion demineralized water while stirring them so as to hydrolyze the sodium silicate. Then, the surface active agent (polyoxyethylenealkylether) was added to the solution while stirring them. Thereafter, the zinc dust was added and reacted for three hours at a room temperature, thereby preparing the zinc dust containing slurry. A compound ratio of each of components was changed to prepare several examples as well as several comparative examples. A test result of stability of each of the examples is shown in Table 1.

TABLE 1

|  | First Example | Second Example | Third Example | First Comp. Example | Second Comp. Example |
| --- | --- | --- | --- | --- | --- |
| Demineralized Water (solids content: 0%) | 79.3 | 76.8 | 72.0 | 69.4 | 79.8 |
| Sodium Silicate ($Na_2O:SiO$ = 1:3) (solids content: 38%) | 0.5 | 3.0 | 7.8 | 10.4 | 0.0 |
| Surfactant (solids content: 0%) | 0.2 | 0.2 | 0.2 | 0.2 | 0.2 |
| Zinc Dust (solids content: 100%) | 20.0 | 20.0 | 20.0 | 20.0 | 20.0 |
| Stability | OK | OK | OK | Gelled | Gas generated |

[wgt. %]

As shown in Table 1, the weight percent (%) of the surface active agent (surfactant) and the zinc dust are set at the same value in each of the first to the third examples and the first and the second comparative examples. Then, the weight % of the sodium silicate ($Na_2O:SiO=1:3$) is increased step by step from the first example, the second example and the third example to the first comparative example. The weight % of the demineralized water is decreased accordingly thereto. The test was performed on the second comparative example that was not added with any sodium silicate ($Na_2O:SiO=1:3$). As a result, it is affirmed that the first to the third examples had good stability. The first comparative example is mixed with 10.4 weight % of sodium silicate ($Na_2O:SiO=1:3$) or contains too many silicate ions. Therefore, the first comparative example was gelled. The second comparative example is mixed with no sodium silicate ($Na_2O:SiO=1:3$) and contains no silica for coating the zinc dust at all. Therefore, as a matter of course, the water and the zinc dust reacted with each other to generate gas.

Consequently, it is concluded that the slurry shows good stability in the water and is not gelled if the compound has the components within the range of the first to the third examples. That is, the zinc dust containing slurry shows the good stability if it is prepared so as to contain the components within the range of 20 weight % of zinc dust (solids content 100%), 0.2 weight % of surface active agent (solids content 0%), 0.5 to 7.8 weight % of sodium silicate ($Na_2O:SiO=1:3$) (solids content 38%) and 72.0 to 79.3 weight % of demineralized water (solids content 0%).

A method of preparing a waterborne coating material from the zinc dust containing slurry and test results of performance are described hereafter. 25 parts by weight of lithium silicate (solids content 23%) as a binder was mixed with 100 parts by weight of the zinc dust containing slurry obtained in the third example shown in Table 1. They were stirred to prepare a waterborne coating material having 77.1% of solids content of the zinc dust containing slurry. The waterborne coating material was kept still for one month at a room temperature. Then, property and condition of the waterborne coating material was judged by visual inspection or visual test. As a result, there was no change at all and the coating material maintained stable property and condition. Moreover, the waterborne coating material containing 77.1 weight % of the zinc dust containing slurry was coated by air spray on an unprocessed cold rolled steel plate that was degreases by a thinner. Then, the coating was preliminarily dried for ten minutes at 80° C. and baked thereafter for 10 minutes at 280° C., thereby preparing a test panel.

A performance test for paint film was carried out on the test panel. Obtained test results are shown in Table 2.

TABLE 2

| Film Thickness | 10 μm |
| --- | --- |
| Adhesive Property | 100/100 |
| Hardness | 8H |
| Salt Spray Resistance | Not less than 1100H |

A film thickness was measured in accordance with JIS K5400 "3.5 How to Prepare Test Piece (6) Film Thickness".

An adhesive property was measured in accordance with JIS K5400 "6.15 Cross Cut Test". Specifically, a cutter knife cuts and penetrates the paint film so as to form eleven straight lines at 1 mm intervals in the lateral direction and the longitudinal direction, respectively. Thereby, one hundred squares or cells are formed in one-centimeter square. Then, an adhesive tape (cellophane tape) is stuck to an cross-cut area of the paint film and peeled therefrom. Thereafter, a number of the cells at which the paint film is kept from peeling is counted. The paint film of the above test panel was kept from peeling off at all the hundred cells and there was no cell peeled off. Therefore, the adhesive property is found very good.

A hardness was measured in accordance with JIS K5400 "6.14 Pencil Scratch Test". Specifically, scratch tests are carried out on a surface of the paint film by a softest pencil of 6B to a hardest pencil of 9H by use of a pencil scratch test machine for a paint film. Then, a hardness of the pencil that can scratch the surface of the paint film is determined as a hardness of the paint film. The test panel has a hardness of 8H and is very excellent in the hardness, too.

A salt spray resistance (antirust property) was measured in accordance with JIS K5400 "7.8 Salt Spray Test". Specifically, the test piece was housed and tested in a slat spray test machine in which salt spray is generated. Then, it is checked whether rust, expansion and peeling are generated on the paint film mainly by an action of the salt spray. Working conditions of the salt spray test machine are set as follows: a temperature inside a test room being 35±1° C., a relative humidity inside the test room being 95 to 98%, a temperature of a humidifier being 47±1° C., a density of a salt water being 5w/v % and so on. There have not been generated yet any rust, expansion and peeling on the test panel even after the test for 1100 hours. Therefore, the first embodiment of the waterborne coating material is judged very excellent in the antirust property, too.

As described above, the first embodiment of the zinc dust containing slurry forms a dense silica film on a surface of the zinc dust. In view thereof, the first embodiment of the slurry uses the sodium silicate solution having a degree of polymerization lower than the conventional colloidal silica. Moreover, in order to decrease more the degree of polymerization and prevent gelation of the slurry, the demineralized water is added for hydrolysis. Then, the surface active agent is added to improve dispersibility of the zinc dust covered by the dense film of the silica in the water, thereby making the zinc dust containing slurry more stable.

Then, 25 parts by weigh of the lithium silicate as the binder was mixed and stirred in 100 parts by weight of the zinc dust containing slurry, thereby preparing the waterborne coating material. The lithium silicate is excellent in stickiness. Therefore, when the waterborne coating material is painted and dried on the surface to be coated to form the paint film, the paint film is excellent in strength as a whole. Moreover, the paint film is strongly stuck to the coated surface. It is affirmed that the waterborne coating material is excellent from the test results as the paint film as shown in Table 2, too.

Second Embodiment

A zinc dust containing slurry and a waterborne coating material according to a second embodiment of the invention is described hereafter. The second embodiment of the zinc containing slurry is obtained as follows. First, demineralized water is added to an alkali silicate (water glass) so as to hydrolyze the water glass and lower the degree of polymerization thereof. Then, a surface active agent, zinc dust and sodium metavanadate or ammonium metavanadate are mixed into such hydrolyzed compound. Thus, the zinc dust containing slurry is prepared.

Specifically, a sodium silicate ($Na_2O:SiO=1:3$) was added to the ion demineralized water (solids content 0%) while stirring them so as to hydrolyze the sodium silicate. Then, the surface active agent (polyoxyethylenealkylether) (solids content 0%) was added to the solution while stirring them. Thereafter, the sodium metavanadate (solids content 100%) or ammonium metavanadate (solids content 100%) and the zinc dust (solids content 100%) were added and reacted for sixteen hours at 40° C., thereby preparing the zinc dust containing slurry that was processed by silica vanadate. A compound ratio of each of components was changed to prepare three kinds of test slurries as shown in Table 3.

TABLE 3

| | Fourth Example | Fifth Example | Third Comp. Example |
|---|---|---|---|
| Demineralized Water (solids content: 0%) | 74.5 | 74.5 | 74.5 |
| Sodium Silicate ($Na_2O:SiO = 1:3$) (solids content: 38%) | 1.0 | 1.0 | 0.0 |
| Surfactant (solids content: 0%) | 0.2 | 0.2 | 0.2 |
| Sodium Metavanadate (solids content: 100%) | 0.5 | 0.0 | 0.5 |
| Ammonium Metavanadate (solids content: 100%) | 0.0 | 0.5 | 0.0 |
| Zinc Dust (solids content: 100%) | 23.8 | 23.8 | 23.8 |

[wgt. %]

As shown in Table 3, an amount of the surface active agent is the same through the three kinds of the test slurries. Moreover, amounts of the demineralized water and the zinc dust are set equal. The third comparative example does not use the sodium silicate ($Na_2O:SiO=1:3$).

Stability of each of the test slurries was judged by measuring an amount of generated gas. A method of measuring the amount of the generated gas was as follows. First, the test slurry was weighed and taken by 200 gram into a conical flask. Then, a rubber plug with a glass tube was fitted on the conical flask. Thereafter, the gas generated from the slurry was collected above the water at a room temperature of 20° C. and an amount of the generated gas was measured after 480 hours. Results were shown in Table 4.

TABLE 4

| | Amount of Generated Gas (cc) |
|---|---|
| Fourth Example | 0 |
| Fifth Example | 0 |
| Third Comparative Example | 20 (1 hour) |

As shown in Table 4, the fourth example and the fifth example did not generate any gas at all after 480 hours passed showed very excellent stability. To the contrary, the third comparative example does not contain any sodium silicate ($Na_2O:SiO=1:3$) for forming a silica coating at al, so that the zinc dust reacted with the demineralized water and generated gas. An amount of generated gas of the third comparative example was 20 cc for one hour as shown in Table 4.

25 parts by weight of lithium silicate was mixed and stirred into 100 parts by weight of the fourth example of the zinc dust containing slurry processed by the silica vanadate that showed the very excellent stability among the slurries. They were stirred to prepare a waterborne coating material having 78.2% of solids content of the zinc dust containing slurry. The obtained waterborne coating material was kept still for one month at a room temperature. Then, property and condition of the water coating material was judged by visual inspection or visual test. As a result, any change was not found externally at all on the waterborne coating material even after one month had past. Thus, the stability was very good.

Moreover, the waterborne coating material was coated by air spray on an unprocessed cold rolled steel plate that was degreases by a thinner. Then, the coating was preliminarily dried for ten minutes at 80° C. and baked thereafter for 10 minutes at 280° C., thereby preparing a test panel. A performance test for paint film was carried out on the test panel. Obtained test results are shown in Table 5.

TABLE 5

| Adhesive Property | 100/100 |
|---|---|
| Hardness | 8H |
| Salt Spray Resistance | Not less than 360H |

The performance test was conducted in the same manner as the first embodiment.

That is, an adhesive property was measured in accordance with JIS K5400 "6.15 Cross Cut Test". Specifically, a cutter knife cuts and penetrates the paint film so as to form eleven straight lines at 1 mm intervals in the lateral direction and the longitudinal direction, respectively. Thereby, one hundred squares or cells are formed in one-centimeter square. Then, an adhesive tape (cellophane tape) is stuck to an cross-cut area of the paint film and peeled therefrom. Thereafter, a number of the cells at which the paint film is kept from peeling is counted. The paint film of the above test panel was kept from peeling off at all the hundred cells and there was no cell peeled off. Therefore, the adhesive property is found very good.

A hardness was measured in accordance with JIS K5400 "6.14 Pencil Scratch Test". Specifically, scratch tests are carried out on a surface of the paint film by a softest pencil of 6B to a hardest pencil of 9H by use of a pencil scratch test machine for a paint film. Then, a hardness of the pencil that can scratch the surface of the paint film is determined as a hardness of the paint film. The test panel has a hardness of 8H and is very excellent in the hardness, too.

A salt spray resistance (antirust property) was measured in accordance with JIS K5400 "7.8 Salt Spray Test". Specifically, the test piece was housed and tested in a slat spray test machine in which salt spray is generated. Then, it is checked whether rust, expansion and peeling are generated on the paint film mainly by an action of the salt spray. Working conditions of the salt spray test machine are set as follows: a temperature inside a test room being 35±1° C., a relative humidity inside the test room being 95 to 98%, a temperature of a humidifier being 47±1° C., a density of a salt water being 5 w/v % and so on. There have not been generated yet any rust, expansion and peeling on the test panel even after the test for 360 hours. Therefore, the second embodiment of the waterborne coating material is judged very excellent in the antirust property, too.

As described above, the first embodiment of the zinc dust containing slurry forms a dense silica film on a surface of the zinc dust. In view thereof, the first embodiment of the slurry uses the sodium silicate solution having a degree of polymerization lower than the conventional colloidal silica. Moreover, in order to decrease more the degree of polymerization and prevent gelation of the slurry, the demineralized water is added for hydrolysis. Then, the surface active agent is added to improve dispersibility of the zinc dust covered by the dense film of the silica in the water, thereby making the zinc dust containing slurry more stable. Furthermore, the sodium metavadate is added so that, even if the silica film suffers a fracture or break, vanadate ions act on such broken part so as to obtain a passive state. Consequently, the stability of the zinc dust in the water is further enhanced.

Then, 25 parts by weigh of the lithium silicate as the binder was mixed and stirred in 100 parts by weight of the zinc dust containing slurry, thereby preparing the waterborne coating material. The lithium silicate is excellent in stickiness. Therefore, when the waterborne coating material is painted and dried on the surface to be coated to form the paint film, the paint film is excellent in strength as a whole. Moreover, the paint film is strongly stuck to the coated surface. It is affirmed that the waterborne coating material is excellent from the test results as the paint film as shown in Table 5, too.

Third Embodiment

A zinc dust containing slurry and a waterborne coating material according to a third embodiment of the invention is described hereafter. The third embodiment of the zinc containing slurry is obtained as follows. First, demineralized water is added to a sodium metasilicate or sodium silicate ($Na_2O:SiO=1:1$) as an alkali silicate having a low mole ratio of silica, thereby to lower the degree of polymerization of the silica. Then, a surface active agent, zinc dust and sodium metavanadate are mixed into such compound. Thus, the zinc dust containing slurry is prepared.

Specifically, the sodium metasilicate or the sodium silicate ($Na_2O:SiO=1:1$) was added to the ion demineralized water while stirring them so as to hydrolyze the sodium silicate. Then, the surface active agent (polyoxyethylenealkylether) was added to the solution while stirring them. Thereafter, the sodium metavanadate and the zinc dust were added and reacted for sixteen hours at 40° C, thereby preparing the zinc dust containing slurry that was processed by silica vanadate. A compound ratio of each of components was changed to prepare three kinds of test slurries as shown in Table 6.

TABLE 6

|  | Sixth Example | Seventh Example | Fourth Comp. Example |
|---|---|---|---|
| Demineralized Water (solids content: 0%) | 48.5 | 74.5 | 48.3 |
| Sodium Silicate ($Na_2O:SiO = 1:3$) (solids content: 38%) | 0.0 | 0.0 | 0.0 |
| Sodium Silicate ($Na_2O:SiO = 1:1$) (solids content: 33%) | 0.0 | 1.0 | 2.0 |
| Sodium Metasilicate (solids content: 42%) | 1.0 | 0.0 | 0.0 |
| Surfactant (solids content: 0%) | 0.1 | 0.2 | 0.4 |
| Sodium Metavanadate (solids content: 100%) | 1.0 | 0.5 | 1.0 |
| Zinc Dust (solids content: 100%) | 49.4 | 23.8 | 48.3 |
| Stability | OK | OK | Gelled |

[wgt. %]

As shown in Table 6, the sixth example and the fourth comparative example decrease the amount of the demineralized water to 50% or less and greatly increase the amount of the zinc dust to substantially the same amount. The sixth example uses 1 to 2 weight % of the sodium metasilicate as the alkali silicate. The seventh example and the fourth comparative example use 1 to 2 weight % of the sodium silicate ($Na_2O:SiO=1:1$) as the alkali silicate. Namely, the sixth example, the seventh example and the fourth comparative example do not use the sodium silicate ($Na_2O:SiO=1:3$) at all. The seventh example is just the same as the fourth example of the second embodiment except it substitutes the sodium silicate ($Na_2O:SiO=1:1$) for the sodium silicate ($Na_2O:SiO=1:3$). The stability of these test slurries was judged by an appearance and an amount of generated gas when it is kept still. A method of measuring the amount of the generated gas was the same as the second embodiment. As a result, as shown in Table 6, the sixth example and the seventh example have no change in appearance and the amount of the generated gas was zero. However, the fourth comparative example was gelled.

Among these slurries, a waterborne coating material containing 81.0% solids content of the zinc dust containing slurry was prepared by use of the sixth example of the zinc dust containing slurry processed by the silica vanadate that showed the excellent stability though it contained a large amount of the zinc dust. A mixing ratio with the binder is shown in Table 7.

TABLE 7

| Sixth Example of Slurry | 58.2 |
|---|---|
| Lithium Silicate | 26.2 |
| Sodium Silicate ($Na_2O:SiO = 1:3$) | 15.6 |
| Total | 100.0 |

[wgt. %]

The obtained waterborne coating material was kept still for one month at a room temperature. Then, property and condition of the waterborne coating material was judged by visual inspection or visual test. As a result, any change was not found externally at all on the waterborne coating material even after one month had past. Thus, the stability was very good.

Moreover, the waterborne coating material was coated by air spray on an unprocessed cold rolled steel plate that was degreases by a thinner. Then, the coating was preliminarily dried for ten minutes at 80° C. and baked thereafter for 10 minutes at 280° C., thereby preparing a test panel. A performance test for paint film was carried out on the test panel. Obtained test results are shown in Table 8.

TABLE 8

| Adhesive Property | 100/100 |
|---|---|
| Hardness | 8H |
| Salt Spray Resistance | Not less than 360H |

The performance test was conducted in the same manner as the first and the second embodiments.

That is, an adhesive property was measured in accordance with JIS K5400 "6.15 Cross Cut Test". Specifically, a cutter knife cuts and penetrates the paint film so as to form eleven straight lines at 1 mm intervals in the lateral direction and the longitudinal direction, respectively. Thereby, one hundred squares or cells are formed in one-centimeter square. Then, an adhesive tape (cellophane tape) is stuck to an cross-cut area of the paint film and peeled therefrom. Thereafter, a number of the cells at which the paint film is kept from peeling is counted. The paint film of the above test panel was kept from peeling off at all the hundred cells and there was no cell peeled off. Therefore, the adhesive property is found very good.

A hardness was measured in accordance with JIS K5400 "6.14 Pencil Scratch Test". Specifically, scratch tests are carried out on a surface of the paint film by a softest pencil of 6B to a hardest pencil of 9H by use of a pencil scratch test machine for a paint film. Then, a hardness of the pencil that can scratch the surface of the paint film is determined as a hardness of the paint film. The test panel has a hardness of 8H and is very excellent in the hardness, too.

A salt spray resistance (antirust property) was measured in accordance with JIS K5400 "7.8 Salt Spray Test". Specifically, the test piece was housed and tested in a slat spray test machine in which salt spray is generated. Then, it is checked whether rust, expansion and peeling are generated on the paint film mainly by an action of the salt spray. Working conditions of the salt spray test machine are set as follows: a temperature inside a test room being 35±1° C., a relative humidity inside the test room being 95 to 98%, a temperature of a humidifier being 47±1° C., a density of a salt water being 5 w/v% and so on. There have not been generated yet any rust, expansion and peeling on the test panel even after the test for 360 hours. Therefore, the third embodiment of the waterborne coating material is judged very excellent in the antirust property, too.

While each of the above embodiments shows examples using the sodium silicate or the sodium metasilicate as the alkali silicate, other compounds may be used as the alkali silicate. For example, sodium silicate of low mole ratio may be used such as potassium silicate, lithium silicate, ammonium silicate and sodium orthosilicate. Moreover, alkoxy silane or the like may be used as the alkali silicate.

While each of the above embodiments shows the example using the lithium silicate as the binder added to the zinc dust containing slurry at the time of preparing the waterborne coating material or the example using the mixture of the lithium silicate and the sodium silicate ($Na_2O:SiO=1:3$), other binders may be used instead. For example, alkali silicate (water glass) other than the above-mentioned, colloidal silica, metal alkoxide, water silicon resin, phenol resin, epoxy resin, urethane resin, acrylic resin, melamine resin and the like may be used. Moreover, a mixture of two or more of them may be used. Thus, the binder is not limited to a specific one as long as it is capable of holding the zinc dust as the paint film after drying and assuring the adhesive property to the paint surface.

While the fourth example of the second embodiment adds the sodium metavanadate, the ammonium metavanadate may be added as shown in the fifth example. Moreover, zirconium salt, tungstate or molybdate may be used in place of the vanadate. Furthermore, a mixture of them may be added.

In each of the embodiments, if the zinc dust containing slurry of 30 to 95 weight % of solids content is contained in the dried paint film of the waterborne coating material made of the zinc dust containing slurry and the waterborne binder, a good antirust function could be obtained without any deterioration of the antirust function of the zinc, the adhesive property to the paint surface and the strength of the paint film. That is, the inventors affirmed that, if the solids content of the zinc dust containing slurry is less than 30 weight % in the dried paint film, the antirust function of the zinc is not performed sufficiently. In contrast, a result was obtained that, if the solids content is more than 95 weight %, the adhesive property to substrates and the coating film surface and the coating film strength decrease. Particularly, the above advantageous property was obvious if the zinc dust containing slurry has the solids content of 65 to 85 weight %.

According to the invention, the zinc dust containing slurry is prepared by adding a demineralized water to a solution of an alkali silicate so as to hydrolyze the alkali silicate and decrease a degree of polymerization of the alkali silicate and mixing and stirring a zinc dust into the solution of the alkali silicate. Since the alkali silicate is hydrolyzed and decreases its degree of polymerization by adding the demineralized water into the solution, a dense film of silica is formed on the surface of the zinc dust. Therefore, the zinc is prevented from contacting with the water and the zinc dust has a high stability in the water. Moreover, the water glass is very cheap in comparison with the colloidal silica, so that the zinc dust containing can be obtained at low costs. Thus, the zinc dust containing slurry that is cheap and that has high stability can be obtained.

According to the invention, in the zinc dust containing slurry, a mole ratio of a silica of the alkali silicate may be lowered so as to further decrease the degree of polymerization of the alkali silicate. The degree of polymerization of the silica can be further decreased by lowering the mole ratio ($SiO2/M2O$) of the silica of the alkali silicate. For example, the mole ratio of the silica can be reduced by using the sodium metasilicate in place of the sodium silicate ($Na_2O:SiO=1:3$). Thereby, a dense coating film of the silica is formed on the surface of the zinc dust, so that a slurry of higher zinc content can be obtained. Thus, it is possible to obtain a zinc dust containing slurry that has high stability and higher zinc content.

According to the invention, the zinc dust containing slurry may be added with one or more of a vanadate, a zirconium salt, a tungstate and a molybdate to the solution of the alkali silicate. Consequently, even if the silica film suffers fracture or broken part, one of the vanadate, the zirconium salt, the tungstate and the molybdate acts on the broken part to obtain passive state. Thereby, the zinc is prevented more reliably from contacting with the water and higher stability of the zinc dust in the water is obtained. Thus, it is possible to provide the zinc dust containing slurry that has higher stability and that is cheap.

According to the invention, in the zinc dust containing slurry, a surface active agent may be added to the solution of the alkali silicate. Consequently, the dispersibility of the zinc dust covered by the dense silica film in the water is improved. Therefore, the zinc dust containing slurry becomes much more stable. Thus, it is possible to provide the zinc dust containing slurry that has high stability and that is cheap.

According to the invention, the zinc dust containing slurry may be prepared by mixing 0.5 to 7.8 weight percent of a solution of a sodium silicate, 72.0 to 79.3 weight percent of the demineralized water, about 0.2 weight percent of the surface active agent and about 20 weight percent of the zinc dust. In the zinc dust containing slurry prepared by the above ingredients within the above compounding ratio, the zinc dust is coated with the dense silica film of the sodium silicate that is hydrolyzed by the demineralized water to lower the degree of polymerization, thereby showing good stability in the water. On the other hand, if the weight percent of the sodium silicate is more than the above value, it is gelled. Then, the stability in the water is assured by preparing the zinc dust containing slurry within the above compounding ratio. Moreover, there is no hydrogen gas generated by the water reacting with the zinc dust. Furthermore, there is no gellation generated by the sodium silicate. Thus, the zinc dust containing slurry of good quality is obtained. An excellent waterborne coating material can be prepared using the zinc dust containing slurry. The waterborne coating material has strong adhesion property when coated on a metal, sufficient hardness of the paint film and excellent antirust property. Thereby, an excellent water zinc rich paint can be manufactured using the waterborne coating material as a basic ingredient.

According to the invention, the zinc dust containing slurry may be prepared by mixing about 1.0 weight percent of a solution of a sodium silicate, about 74.5 weight percent of the demineralized water, about 0.2 weight percent of the surface active agent, about 23.8 weight percent of the zinc dust, about 0.5 weight percent of one or more of a vanadate, a zirconium salt, a tungstate and a molybdate. In the zinc dust containing slurry prepared by the above ingredients within the above compounding ratio, the zinc dust is coated with the dense silica film of the sodium silicate that is hydrolyzed by the demineralized water to lower the degree of polymerization. If there is a broken part in the silica film, the vanadate ions or the like act on the broken part of the silica film to get passive state. Thus, the slurry shows good stability in the water. On the other hand, if the weight percent of the sodium silicate is more than the above value, it is gelled. Then, the stability in the water is assured by preparing the zinc dust containing slurry within the above compounding ratio. Moreover, there is no hydrogen gas generated by the water reacting with the zinc dust. Furthermore, there is no gellation generated by the sodium silicate. Thus, the zinc dust containing slurry of good quality is obtained. An excellent waterborne coating material can be prepared using the zinc dust containing slurry. The waterborne coating material has strong adhesion property when coated on a metal, sufficient hardness of the paint film and excellent antirust property. Thereby, an excellent water zinc rich paint can be manufactured using the waterborne coating material as a basic ingredient.

According to the invention, the zinc dust containing slurry may be prepared by mixing about 1.0 weight percent of a sodium metasilicate, about 48.5 weight percent of the demineralized water, about 0.1 weight percent of the surface active agent, about 49.4 weight percent of the zinc dust, about 1.0 weight percent of one or more of a vanadate, a zirconium salt, a tungstate and a molybdate. In the zinc dust containing slurry prepared by the above ingredients within the above compounding ratio, the zinc dust is coated with the dense silica film of decreased degree of polymerization by use of the sodium metasilicate that has a low mole ratio of silica ($SiO_2/M_2O$) as the alkali silicate. Thereby, the zinc dust can be mixed at a very high density. Moreover, even if the silica film has a broken part, the vanadate ions and the like act on the broken part of the silica film to provide passive state, so that it exhibits better stability in the water. An excellent waterborne coating material can be prepared using the zinc dust containing slurry. The waterborne coating material has strong adhesion property when coated on a metal, sufficient hardness of the paint film and excellent antirust property.

According to the invention, the waterborne coating material may be obtained by mixing and stirring a lithium silicate into the zinc dust containing slurry. The lithium silicate is a kind of the water glass and excellent in the adhesive property and acts as a binder. Then, the lithium silicate is added to the zinc dust containing slurry and serves sufficiently as the binder, thereby giving the waterborne coating material high quality.

According to the invention, the waterborne coating material may be obtained by mixing and stirring about 26.2 weight percent of a lithium silicate and about 15.6 weight percent of a sodium silicate into 58.2 weight percent of the zinc dust containing slurry. As a result of an experimentation, the best property was obtained as a binder in case the lithium silicate and the sodium silicate were mixed at the above ratio.

The preferred embodiments described herein are illustrative and not restrictive, the scope of the invention being indicated in the appended claims and all variations which come within the meaning of the claims are intended to be embraced therein.

What is claimed is:

1. A zinc dust containing slurry prepared by:
    adding a demineralized water to a solution of an alkali silicate so as to hydrolyze the alkali silicate and decrease a degree of polymerization of the alkali silicate; and
    mixing and stirring a zinc dust into the solution of the alkali silicate;
    wherein a dense coating of a silica is formed on a surface of the zinc dust by the decreasing of the degree of polymerization of the alkali silicate, thereby preventing the zinc dust from being contacted with the water so that the zinc dust has a stability in the water so as not to be gelled in the water or not to generate hydrogen gas.

2. A zinc dust containing slurry according to claim 1, in which the alkali silicate ($xM_2OySiO_2$) has a lower molar ratio of a silica ($SiO_2$) to an alkali metal ($M_2O$) so that the molar ratio of the silica to the alkali metal is about 1:1 so as to further decrease the degree of polymerization of the alkali silicate.

3. A zinc dust containing slurry according to claim 1, in which one or more of a vanadate, a zirconium salt, a tungstate and a molybdate is added to the solution of the alkali silicate.

4. A zinc dust containing slurry according to claim 1, in which a surface active agent is added to the solution of the alkali silicate.

5. A zinc dust containing slurry according to claim 4 prepared by mixing 0.5 to 7.8 weight percent of a solution of a sodium silicate, 72.0 to 79.3 weight percent of the demineralized water, about 0.2 weight percent of the surface active agent and about 20 weight percent of the zinc dust.

6. A zinc dust containing slurry according to claim 4 prepared by mixing about 1.0 weight percent of a solution of a sodium silicate, about 74.5 weight percent of the demineralized water, about 0.2 weight percent of the surface active agent, about 23.8 weight percent of the zinc dust, about 0.5 weight percent of one or more of a vandate, a zirconium salt, a tungstate and a molybdate.

7. A zinc dust containing slurry according to claim 4 prepared by mixing about 1.0 weight percent of a sodium metasilicate, about 48.5 weight percent of the demineralized water, about 0.1 weight percent of the surface active agent, about 49.4 weight percent of the zinc dust, about 1.0 weight percent of one or more of a vanadate, a zirconium salt, a tungstate and a molybdate.

8. A waterborne coating material prepared by using the zinc dust containing slurry according to one of claims 1 to 7.

9. A waterborne coating material according to claim 8 obtained by mixing and stirring a lithium silicate into the zinc dust containing slurry.

10. A waterborne coating material obtained by mixing and stirring 20 to 30 parts by weight of a lithium silicate into the zinc dust containing slurry according to claim 5.

11. A waterborne coating material obtained by mixing and stirring 20 to 30 weight percent of a lithium silicate into 100 weight percent of the zinc dust containing slurry according to claim 6.

12. A waterborne coating material obtained by mixing and stirring about 26.2 weight percent of a lithium silicate and about 15.6 weight percent of a sodium silicate into 58.2 weight percent of the zinc dust containing slurry according to claim 7.

13. A waterborne coating material made of the zinc dust containing slurry according to claim 5 and a waterborne binder, the waterborne coating material containing 30 to 95 weight percent of solids content of the zinc dust containing slurry in a dried paid film of the waterborne coating material.

14. A waterborne coating material made of the zinc dust containing slurry according to claim 6 and a waterborne binder, the waterborne coating material containing 30 to 95 weight percent of solids content of the zinc dust containing slurry in a dried paid film of the waterborne coating material.

15. A waterborne coating material made of the zinc dust containing slurry according to claim 7 and a waterborne binder, the waterborne coating material containing 30 to 95 weight percent of solids content of the zinc dust containing slurry in a dried paint film of the waterborne coating material.

16. A zinc dust containing slurry according to claim 2, in which the alkali silicate is a sodium metasilicate or a sodium silicate ($xNa_2OySiO_2$) that has a molar ratio of a silica ($SiO_2$) to an alkali metal ($Na_2O$) of about 1:1.

17. A zinc dust containing slurry prepared by:
adding a demineralized water to a solution of an alkali silicate without existence of any colloidal silica so as to hydrolyze the alkali silicate and decrease a degree of polymerization of the alkali silicate; and mixing and stirring a zinc dust into the solution of the alkali silicate;

wherein a dense coating of a silica is formed on a surface of the zinc dust by the decreasing of the degree of polymerization of the alkali silicate, thereby preventing the zinc dust from being contacted with the water so that the zinc dust has a stability in the water so as not to be gelled in the water or not to generate hydrogen gas.

* * * * *